United States Patent
Mordan et al.

(10) Patent No.: US 11,973,874 B1
(45) Date of Patent: Apr. 30, 2024

(54) SYSTEMS AND METHODS FOR TOKEN METADATA MANAGEMENT

(71) Applicant: DK Crown Holdings Inc., Boston, MA (US)

(72) Inventors: Kevan Connor Mordan, Ogden, UT (US); Mohammad Reza Kavian, Toronto (CA); Benjamin Ilan Weinberg, Toronto (CA)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/336,732

(22) Filed: Jun. 16, 2023

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC ................................ H04L 9/3213; H04L 9/50
USPC ............................................................ 726/9
See application file for complete search history.

(56) References Cited

U.S. PATENT DOCUMENTS

| | | | | |
|---|---|---|---|---|
| 11,469,886 B2* | 10/2022 | Padmanabhan | ......... | G06F 21/64 |
| 11,723,391 B2* | 8/2023 | Morita | ................... | A23L 27/36 |
| | | | | 426/548 |
| 11,824,970 B2* | 11/2023 | Padmanabhan | ....... | G06F 16/953 |
| 2019/0130391 A1* | 5/2019 | Wright | ................. | H04L 9/3247 |
| 2021/0226774 A1* | 7/2021 | Padmanabhan | ....... | H04L 9/0643 |
| 2022/0006642 A1* | 1/2022 | Maj | ....................... | H04L 63/123 |
| 2023/0006976 A1* | 1/2023 | Jakobsson | ........... | H04L 63/1441 |
| 2023/0356091 A1* | 11/2023 | Eisenberg | ............... | A63F 13/75 |
| 2023/0367776 A1* | 11/2023 | Padmanabhan | ..... | G06F 16/2282 |
| 2023/0371995 A1* | 11/2023 | Vogt | ................. | B01F 33/50112 |

* cited by examiner

*Primary Examiner* — Dant B Shaifer Harriman
(74) *Attorney, Agent, or Firm* — Foley & Lardner LLP

(57) ABSTRACT

Systems and methods for token metadata management are disclosed. A system can determine that a token has been minted on a blockchain based on a smart contract identifying an identifier of the token and a base uniform resource identifier (URI). Responsive to determining that the token has been minted on the blockchain, the system stores metadata for the token at a location in a database. The database corresponds to the base URI and the location in the database is identified by the identifier of the token. The system generates a metadata URI for the token based on the base URI and the identifier for the token, detects a change to a status of a contest identified in the metadata of the token, and upon detecting the change to the status of the contest, modifies the metadata of the token using the metadata URI.

20 Claims, 4 Drawing Sheets

SYSTEMS AND METHODS FOR TOKEN METADATA MANAGEMENT

BACKGROUND

Non-fungible tokens (NFTs) are created or "minted" using blockchain technology. Various NFTs may be minted using smart contracts, which may be software with predefined rules that is encoded on the blockchain. Smart contracts may be executed by nodes in a blockchain network to mint NFTs by writing transactions to the blockchain.

SUMMARY

When an NFT is minted, the smart contract may associate the NFT with metadata, which is written to the blockchain with the NFT. However, minting many NFTs with different metadata conventionally requires writing large amounts of metadata to the blockchain, placing a computational strain on the distributed blockchain network and contributing to slower execution times, thereby reducing the overall speed and efficiency of the minting process. When the network is congested, transaction processing times can significantly increase, causing delays in minting new NFTs.

The systems and methods described herein address these and other issues by providing a smart contract that mints NFTs using a shared, or "base" uniform resource identifier (URI) in place of the metadata for minted tokens. Rather than writing different for each newly minted token and congesting the blockchain network, the systems and methods described herein write a base URI to the block chain, which is then shared across a larger batch of NFTs. A respective metadata URI can then be generated using both an identifier of each newly minted token and the base URI. The metadata URI can point to a location in a database or other data storage where the metadata for the respective token is stored. These techniques therefore provide a technical improvement to computational platforms that mint NFTs by reducing blockchain network congestion and improving performance when minting large numbers of NFTs.

One aspect of the present disclosure is directed to a method. The method may be performed, for example, by one or more processors coupled to memory. The method includes determining that a token has been minted on a blockchain based on a smart contract identifying an identifier of the token and a base URI. The method includes, responsive to determining that the token has been minted on the blockchain, storing metadata for the token at a location in a database. The location is identified by the identifier of the token, the database corresponding to the base URI. The method includes generating a metadata URI for the token, based on the base URI and the identifier for the token. The method includes detecting a change to a status of a contest identified in the metadata of the token. The method includes, responsive to detecting the change to the status of the contest, modifying the metadata of the token using the metadata URI.

In some implementations, generating the metadata URI comprises appending the identifier of the token to the base URI as a URI parameter. In some implementations, detecting the change to the status of the contest comprises receiving an update message identifying the change to the status from one or more servers. In some implementations, the method includes causing a second token to be minted on the blockchain, the second token associated with the base URI and a second identifier. In some implementations, the method includes accessing second metadata of the second token using a second metadata URI generated based on the base URI and the second identifier. In some implementations, the change in the status comprises one or more of a determination of an outcome of the contest, an indication of at least one fantasy lineup corresponding to the outcome of the contest, or an indication of a score assigned to the token during the contest.

In some implementations, modifying the metadata of the token comprises storing an identifier of the contest as part of the metadata. In some implementations, the method includes determining that the token has been assigned to a player profile of a plurality of player profiles; and updating the metadata of the token to include an identifier of the player profile. In some implementations, the smart contract further identifies a wallet address. In some implementations, the method includes determining that the token has been minted on the blockchain further comprises determining that the token has been transferred to the wallet address. In some implementations, the method includes generating the metadata of the token to include at least one rarity value and at least one edition number.

One other aspect of the present disclosure is directed to a system. The system includes one or more processors coupled to memory. The system can determine that a token has been minted on a blockchain based on a smart contract identifying an identifier of the token and a base URI. The system can, responsive to determining that the token has been minted on the blockchain, store metadata for the token at a location in a database, the location identified by the identifier of the token, and the database corresponding to the base URI. The system can generate a metadata URI for the token based on the base URI and the identifier of the token. The system can detect a change to a status of a contest identified in the metadata of the token. The system can responsive to detecting the change to the status of the contest, modify the metadata of the token using the metadata URI.

In some implementations, the system can generate the metadata URI by performing operations comprising appending the identifier of the token to the base URI as a URI parameter. In some implementations, the system can detect the change to the status of the contest by performing operations comprising receiving an update message identifying the change to the status from one or more servers. In some implementations, the system can cause a second token to be minted on the blockchain, the second token associated with the base URI and a second identifier. In some implementations, the system can access second metadata of the second token using a second metadata URI generated based on the base URI and the second identifier. In some implementations, the change in the status comprises one or more of a determination of an outcome of the contest, an indication of at least one fantasy lineup corresponding to the outcome of the contest, or an indication of a score assigned to the token during the contest.

In some implementations, the system can modify the metadata of the token by storing an identifier of the contest as part of the metadata. In some implementations, the system can determine that the token has been assigned to a player profile of a plurality of player profiles; and update the metadata of the token to include an identifier of the player profile. In some implementations, the smart contract further identifies a wallet address. In some implementations, the system can determine that the token has been minted on the blockchain by performing operations comprising determining that the token has been transferred to the wallet address.

In some implementations, the system can generate the metadata of the token to include at least one rarity value and at least one edition number.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated into and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The systems and methods described herein improving the performance of minting and managing metadata for NFTs on a blockchain by using a shared, base URI in place of the metadata when minting tokens on the blockchain. As described herein, writing different metadata for each newly minted token on the blockchain introduces computational strain on the blockchain network, causing slower execution and transaction times, and therefore reducing the overall speed and efficiency of the minting process. To address these and other issues, the systems and methods described herein write a base URI to the block chain, which is then shared across a larger number of NFTs. A respective metadata URI can then be generated using both an identifier of each newly minted token and the base URI. The metadata URI can point to a location in an off-blockchain storage where the token metadata is stored.

Storing the metadata for each minted token off-blockchain provides a number of performance advantages. For example, retrieving metadata directly from the blockchain can be slower compared to accessing data from off-blockchain storage. This is because off-blockchain storage systems are optimized for fast retrieval and efficient data access, in contrast to conventional blockchain systems, resulting in improved performance when interacting with the associated metadata of NFTs. Further, because blockchains are immutable, changing on-chain metadata requires an additional transaction to be written to the blockchain. When modifying the metadata for large batches of NFTs, the systems and methods described herein can access the database using the respective metadata URIs of each token, rather than making computationally costly calls to blockchain smart contracts.

Metadata for the various tokens described herein can be modified based on a variety of conditions. In one example, NFTs described herein may be provided as tokens to enter various fantasy sports contests. Upon completion or changes in status of the contests, the metadata for the entrant NFTs can be modified to indicate the change in status or other information relating to the contest. The metadata of various NFTs may also be modified to reflect detected events, such as changes in scores of sporting events, indications of plays that occur during a game (e.g., if an NFT represents an athlete or player of a sporting event), or indications of contest-specific statistics, such as number of contests won or number of contests entered. These and other techniques are described in further detail herein.

Figure 1:
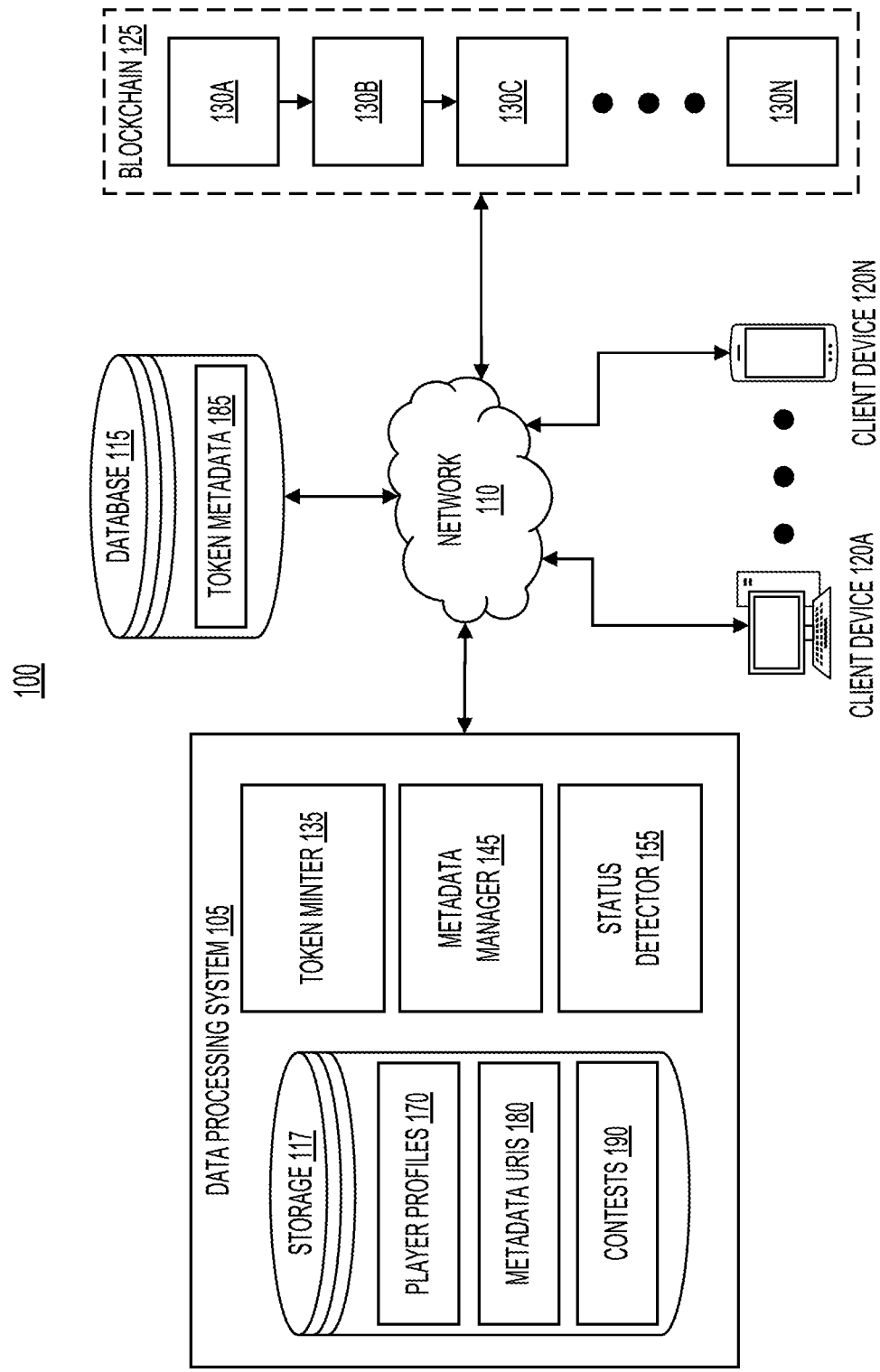
FIG. 1 illustrates a block diagram of an example data processing system for improving the performance of minting and managing metadata for tokens, in accordance with one or more implementations.

Referring now to FIG. 1, a system 100 is shown that includes a data processing system 105, a database 115, one or more client devices 120A-120N (sometimes generally referred to in the singular or the plural as "client device(s) 120") and a blockchain network 125. The data processing system 105 is shown that improves the performance of minting and managing metadata for NFTs. The data processing system 105 can be a server system, a cloud-computing platform, a local computing system, a node in a distributed network, a desktop computer, a client device, or any other system that can process information. The data processing system 105 can be or include one or multiple computing nodes, servers, or distributed processing systems. The data processing system 105 can include a token minter 135, a metadata manager 145, a status detector 155, and storage 117. The token minter 135, the metadata manager 145, the status detector 155, and the storage 117 can include software, applications, scripts, code, objects, hardware, or the like (or combinations thereof) that are configured to perform the various tasks, operations, and techniques described herein.

The token minter 135, the metadata manager 145, the status detector 155, and the storage 117 can be implemented on a single data processing system 105 or implemented on multiple, separate data processing systems 105. The token minter 135, the metadata manager 145, the status detector 155, and the storage 117 can include portions of computer software, modules, software components, combinations of hardware and software components, or the like. Although various processes are described herein as being performed by the data processing system 105, it should be understood that said operations or techniques may also be performed by other computing devices (e.g., one or more client devices 120, nodes of the blockchain network 125, etc.), either individually or via communications with the data processing system 105. Similarly, the client device 120 may include one or more of the components (e.g., token minter 135, the metadata manager 145, the status detector 155, the storage 117) of the data processing system 105, and may carry out any of the various functionalities described herein.

The data processing system 105 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all the components and perform any or all the functions of the computer system 400 described in connection with FIG. 4.

The network 110 can include computer networks such as the Internet, local, wide, metro or other area networks, intranets, satellite networks, other computer networks, such as mobile phone (voice or data) communication networks, or combinations thereof. The data processing system 105 of the system 100 can communicate via the network 110 with one or more computing devices, such as the one or more client devices 120. The network 110 may be any form of computer network that can relay information between the data processing system 105, the one or more client devices 120, the database 115, the blockchain network 125, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may further include any number of hardwired or wireless connections. Any or all of the computing devices described herein (e.g., the data processing system 105, the one or more client devices 120, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more client devices 120, the computer system 100, etc.) may also communicate wirelessly with the computing devices of the network 110 via a proxy device (e.g., a router, network switch, or gateway).

The database 115 can be or include a data repository, a database, a set of databases a storage medium, or non-transitory memory device(s), among others. The database 115 is shown, in this example, as being external to the data processing system 105. However, in some implementations, the database 115 may be internal to the data processing system 105. The database 115 may be associated with a base URI, which may identify a location of a file, script, or network-addressable location of the database 115 that enables access to the token metadata 185. For example, the base URI may be a network address for the database 115, or a directory, filesystem, or memory structure stored within the database 115, which may be utilized to access the functionality of the database 115. The contents of the database 115 may be accessed or using one or more application programming interfaces (APIs) (e.g., a REST API) or software using the URI. In an example, the base URI may point, for example, to a cloud storage bucket, a key, a portion of a key, or combinations thereof, to access, retrieve, modify, delete, or create any of the information described herein, including token metadata 185.

Token metadata 185 for a token can be stored in association with, and may be accessed based on, a corresponding token identifier for the token. As described in further detail herein, token metadata 185 for a particular token may be created, deleted, retrieved, modified, or otherwise accessed using a metadata URI 180 generated as a combination of the base URI for the database 115 and an identifier of the token to which the token metadata 185 corresponds. In one example, the base URI may identify a bucket location for the database 115, and the identifier of the token may be utilized as a key value to identify the object (in this example, the token metadata 185 for the corresponding token) stored within the bucket identified by the base URI.

The database 115 can store corresponding token metadata 185 for any number of tokens, including NFTs. The token metadata 185 may include any information relating to the token to which it corresponds. The token metadata 185 may be stored, for example, in the JavaScript Object Notation (JSON) format. The token metadata 185 for a token may include, but is not limited to, a token name, a token description, an image, thumbnail, graphic, audio, video, or other content (e.g., media files), creator information, date of creation, edition information (e.g., an edition number, collection identifier, pack identifier, promotion identifier, etc.), rarity information (e.g., a rarity value corresponding to a "common", "elite" or "legendary", etc.), or other attributes, such as a "superstar" attribute. In some implementations, the token metadata 185 for a token may include an identifier of an athlete, identifiers of one or more fantasy sports contests in which the token has been an entrant, outcomes of any past fantasy sports contests in which the token was entered, an identifier of a team corresponding to the token (e.g., a sports team for the athlete identified in the token, etc.), or any other information relating to fantasy sports.

Although shown here as external to the data processing system 105, the database 115 may, in some implementations, be internal to the data processing system 105. In some implementations, the database 115 may, for example, be part of a cloud computing system or an external computing device in communication with the devices (e.g., the data processing system 105, the client devices 120, etc.) of the system 100 via the network 110. The database 115 may store any other information described herein, including token identifiers, metadata URIs 180, the base URI, or any other information described herein. In some implementations, the database 115 may implement authentication procedures (e.g., key sharing, encryption, etc.) such that only the data processing system 105 can modify the token metadata 185 of a token. In some implementations, the client devices 120 may have read access, but cannot modify, the contents of the database 115. In some implementations, the database 115 may not authorize access to the client devices 120. In such implementations, the client devices 120 may transmit a request to access the token metadata 185 to the data processing system 105, which can retrieve and provide the token metadata 185 to the requesting client device 120.

Each of the client devices 120 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 120 can include one or more computing devices or servers that can perform various operations as described herein. The one or more client devices 120 can include any or all of the components and perform any or all of the functions of the computer system 100, described herein in conjunction with FIGS. 1A-1D. The client devices 120 may be or may include any of the structure or functionality of the computing system 400, described in connection with FIG. 4.

Each client device 120 can be a personal computer, a laptop computer, a television device, a smart phone device, a mobile device, or another type of computing device. Each client device 120 can be implemented using hardware or a combination of software and hardware. Each client device 120 can include a display or display portion. The display can include a display portion of a television, a display portion of a computing device, or another type of interactive display (e.g., a touchscreen, etc.). Each client device 120 may include one or more I/O devices (e.g., a mouse, a keyboard, digital keypad, buttons, trackpads, touch sensor of the touchscreen, etc.). The display can include a touch screen displaying an application, such as a web browser application or a native application, which may be used to access the functionality of the data processing system 105, as described herein.

A client device 120 can receive interactions from a player. The client device 120 may also receive interactions via any other type of I/O device. The interactions can result in interaction data, which can be stored and transmitted by the processing circuitry of the client device 120. The interaction data can include, for example, interaction coordinates, an interaction type (e.g., drag, click, swipe, scroll, tap, etc.), and an indication of an actionable object (e.g., an interactive user-interface element, such as a button, hyperlink, etc.) with which the interaction occurred. The interaction data can identify a user-interface element (e.g., including any of the user-interface elements described in connection with FIGS. 6A-6H) with which the interaction occurred.

Each client device 120 can include an input device that couples or communicates with the display of each client device 120 to enable a player to interact with or select one or more actionable objects as described herein. The display can enable interaction with one or more visual indications provided through the display of each client device 120, and be responsive to an interaction (e.g., select, click-on, touch, hover). The client device 120 can generate an indication identifying a user input or selection of a wager, a live event, a contest 190, an NFT, or submittal of a lineup, among others.

Each of the client devices 120 can include or be identified by a device identifier, which can be specific to each respective client device 120. The device identifier can include a script, code, label, or marker that identifies a particular client device 120. In some implementations, the device identifier can include a string or plurality of numbers, letters, characters, or any combination of numbers, letters, and characters. In some embodiments, each client device 120 can have a unique device identifier. Each client device 120 can include a client application, which can be a web browser or a native application that communicates with the data processing system 105 to present user interfaces, enter NFTs into contests, request retrieval of token metadata 185, generate one or more data records corresponding to a live event (e.g., a post, a wager, etc.), or other functionality described herein. The application interfaces can, for example, be application interfaces that present different types of configuration interfaces for various tokens minted by data processing system 105, such as an interface to update a lineup of contests 190 or a selection to retrieve or access token metadata 185 of one or more tokens minted via the data processing system, among other functionalities. The client application can be executing on each client device 120 and may be provided to the client device 120 by the data processing system 105 or via an application distribution platform. The application can include a web application, a server application, a resource, a desktop, or a file.

The application can include a local application (e.g., local to a client device 120), hosted application, a SaaS application, a virtual application, a mobile application, or other forms of content. In some implementations, the application can include or correspond to applications provided by remote servers or third-party servers. In some implementations, the application can access the player profiles 170, the metadata URIs 180, the contests 190, or token metadata 185 stored and maintained in the storage 117 and the database 115. The application may generate or otherwise present one or more interactive user-interface elements, include user-selectable hyperlinks, buttons, graphics, videos, images, or other interactive elements to control the functionality of the application make corresponding requests to the data processing system 105 to perform any of the techniques described herein. Interactions with such interactive user-interface elements (sometimes referred to as "actionable objects") can cause the application executing on the respective client device 120 to generate a signal, which can cause the application to perform further operations corresponding to the actionable object.

In some implementations, one or more client devices 120 can establish one or more communication sessions with the data processing system 105. A communication session can include a channel or connection between the data processing system 105 and a respective client device 120. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include encrypted files, data, or traffic.

The session may be established based on information of a player profile 170 of a user accessing the functionality of the data processing system 105.

In some implementations, in response to interactions with corresponding user-interface elements, the application executing on a client device 120 can transmit information, such as player profile 170 information (e.g., changing player profile 170 parameters, changing login information, etc.), interaction information, selections of wager amounts, selections to input tokens into a lineup, selections to enter a contest 190, selections to request information about the status of a contest 190, selections to request token metadata 185 of one or more tokens associated with the player profile 170 of the player, among other selections or requests described herein. For example, the client device 120 can transmit a request for one or more participants of a live event (e.g., athletes playing for a particular team during a live event, etc.). Additional requests may also be transmitted, including requests to place one or more wagers, view attributes of an NFT, or to obtain information (e.g., available contests 190, view selection rules, etc.) related to one or more live events, among others. The requests can be hypertext transfer protocol (HTTP or HTTPS) request messages, file transfer protocol messages, email messages, text messages, or any other type of message that can be transmitted via the network 110.

The blockchain network 125 includes a decentralized system of nodes, e.g., computing systems, each maintaining a copy of the entire blockchain. Nodes of the blockchain network 125 utilize cryptography to enable secure, transparent transactions that are verifiable on blocks 130A-130N (sometimes generally referred to herein as "block(s) 130") on the blockchain. Each node in the blockchain network 125 can validate new transactions, following a consensus protocol of the blockchain network 125. When a new block 130 is created, the new block 130 can include a list of recent, validated transactions. As shown, each block 130 (including a newly created block 130) is linked to the previous block 130 of the blockchain. The link may be generated via a cryptographic hash, creating a "chain" of blocks.

The blocks 130 of the blockchain network 125 can each include a list of transactions that have been validated by the nodes of the blockchain network 125, a reference to the previous block in the chain, state data of the blockchain, ommers, as well as encoded bytecode for one or more smart contracts. Blockchain networks 125 are secure because, to tamper with a transaction, an attacker would need to modify the block containing the transaction, as well as all subsequent blocks. Due to the distributed nature of the blockchain network 125, doing so would exceed the combined computational power of the entire network, thereby making the blockchain secure against such attacks. Smart contracts, which are self-executing contracts with the terms of the agreement that are directly written into code, can also be hosted on the blockchain, enabling decentralized applications that may be capable of minting tokens, such as the NFTs described herein.

Smart contracts include digital programs that execute predefined rules or conditions when deployed onto the blockchain network 125 (e.g., in a corresponding block 130). Smart contracts include self-executing contracts with terms of the agreement being directly written into code. These terms can include everything from simple transactions (like sending a certain amount of cryptocurrency from one wallet to another) to complex logic. Smart contracts are compiled into bytecode and then deployed onto the blockchain by creating a transaction that includes the bytecode of the smart contract, which is then broadcast to the blockchain network 124. Once the transaction is confirmed, the smart contract becomes a part of the blockchain, assigned with a unique address in a block 130. Smart contracts described herein can be executed to perform various functionality, including minting tokens (e.g., NFTs such as ERC-721 tokens, etc.).

The storage 117 can be a computer-readable memory that can store or maintain any of the information described herein. The storage 117 can store or maintain one or more data structures, which may contain, index, or otherwise store each of the values, pluralities, sets, variables, vectors, numbers, or thresholds described herein. The storage 117 can be accessed using one or more memory addresses, index values, or identifiers of any item, structure, or region maintained in the storage 117. The storage 117 can be accessed by the components of the data processing system 105, or any other computing device described herein, via the network 110. In some implementations, the storage 117 can be internal to the data processing system 105. In some implementations, the storage 117 can exist external to the data processing system 105 and may be accessible via the network 110. The storage 117 can be distributed across many different computer systems or storage elements, and may be accessed via the network 110 or a suitable computer bus interface. The data processing system 105 can store, in one or more regions of the memory of the data processing system 105 or in the storage 117, the results of any or all computations, determinations, selections, identifications, generations, constructions, or calculations in one or more data structures indexed or identified with appropriate values.

Any or all values stored in the storage 117 may be accessed by any computing device described herein, such as the data processing system 105, to perform any of the functionalities or functions described herein. In some implementations, a computing device, such as a client device 120, may utilize authentication information (e.g., username, password, email, etc.) to show that the client device 120 is authorized to access requested information in the storage 117. The storage 117 may include permission settings that indicate which users, devices, or profiles are authorized to access certain information stored in the storage 117. In some implementations, instead of being internal to the data processing system 105, the storage 117 can form a part of a cloud computing system. In such implementations, the storage 117 can be a distributed storage medium in a cloud computing system and can be accessed by any of the components of the data processing system 105, by the one or more client devices 120 (e.g., via one or more user interfaces, etc.), or any other computing devices described herein.

The storage 117 can store or otherwise maintain one or more player profiles 170, for example, in one or more data structures. Each player profile 170 can be associated with a corresponding player (e.g., a user) of a client device 120 that accesses the functionality of the data processing system 105. In implementations where the data processing system 105 can operate without using a client device 120 (e.g., a slot machine, a video game machine, a standalone kiosk, etc.), a player profile 170 may correspond to a player that accesses the data processing system 105 to place wagers, enter contests 190, or access token metadata 185 of one or more tokens associated with the player profile.

The data processing system 105 may correspond to a central wallet address, which is recorded on the blockchain as storing, or "owning" various tokens minted according to the techniques described herein. Each player profile 170 may include a list of tokens that are maintained by the central wallet and owned by the corresponding player of the player profile 170. The data processing system 105 can update the list of tokens as the player acquires, sells, or trades tokens. A client device 120 may, in some implementations, transmit requests to access the list of tokens of the player profile 170 of the player using the client device 120. In response, the data processing system can access the player profile 170 to identify the tokens owned by the player. In some implementations, the data processing system can access the token metadata 185 corresponding to the tokens identified in the player profile 170, to perform updates (e.g., in response to changes in contest status) or to provide the token metadata 185 in the form of content to the client device 120 for display.

Each player profile 170 can be a user profile that includes information about a user. Each player profile 170 may include information about one or more of the client devices 120 used to access the data processing system 105 using the player profile 170. For example, identifiers of a player profile 170 can be used to access the functionality of the data processing system 105 via the network 110. In some implementations, a player profile 170 may include a private key. The private key can be used to access or associate one or more tokens with the player profile 170, in some implementations. A private key may indicate to or confirm for the data processing system 105 that a player owns one or more token(s).

The identifiers of player profiles 170 can include a username, a password, an e-mail address, a phone number, a personal identification number (PIN), a secret code-word, a private key or device identifiers for use in a two-factor authentication technique, among others. The player profile 170 can store historical information about contests 190, such as contests viewed, selected, wagered upon (including, e.g., parlay wagers), or entered using the tokens identified in the player profile 170, or live event outcomes, or other historical information. The player profile 170 can store a credit balance or wager information (e.g., an amount of a wager, a timestamp associated with a wager, information about the presence of an indication to participate in a bonus opportunity using the wager, a client device identifier of a client device 120 that was used to submit a lineup, tokens, or other information or entry data to a contest 190, the number of contests 190 played using the player profile 170, etc.). The player profile 170 can store indicators of outcomes of contests 190 that the corresponding player has entered.

The player profile 170 can store information about a client device 120 used to access the data processing system 105, such as an internet protocol (IP) address, a media access control (MAC) address, a global unique identification (GUID), a player profile 170 name (e.g., the name of the user of the client device 120, a player-chosen username, etc.), or a device name, among others. In some implementations, a player profile 170 can be created by the data processing system 105 in response to a player profile 170 creation request transmitted by a client device 120. The player profile 170 creation request can include any of the player profile 170 information described herein. In some implementations, a client device 120 accessing the data processing system 105 may not be associated with a player profile 170. In such implementations, the data processing system 105 can automatically create a player profile 170 using an identifier of the client device 120 provided by the client device 120.

The storage 117 can store or otherwise maintain one or more metadata URIs 180, for example, in one or more data structures. As described in further detail herein, the data processing system 105 can cause tokens (e.g., NFTs such as ERC-721 tokens) to be minted via the blockchain network 125. When doing so, the smart contract executing on the blockchain network 125 (e.g., the nodes thereof) can return corresponding identifiers of the minted tokens. The identifiers of the generated tokens may uniquely identify each token that is minted. The metadata URIs 180 can point to a location in the database 115 at which corresponding token metadata 185 for each minted token is stored. The identifiers of each token may, in some implementations, be deterministic or predictable (e.g., a counter that is incremented by one for each minted token). Therefore, in some implementations, the data processing system 105 can generate corresponding metadata URIs 180 for each token before, during, or after (e.g., in response to, any time after) each token is minted.

The metadata URIs 180 can be any type of URI with any type of protocol, address, or parameters. The metadata URIs 180 may include a portion that corresponds to or matches with a base URI that identifies the location of the database 115 (or a storage bucket within the database 115). The metadata URI 180 for a token can include the base URI with the identifier of the token as a parameter. The parameter (e.g., token identifier) can be received by the database 115 when a corresponding request is made, and the database 115 can return the token metadata 185 from a location in the database 115 identified by the identifier of the token. In some implementations, the parameter in the metadata URI 180 may be an encoded or encrypted version of the identifier of the token, which may be decrypted or decoded software of the data processing system 105 or by the database 115. In some implementations, the token metadata 185 may be encrypted or encoded when returned to the data processing system 105 from the database 115, and subsequently decrypted or decoded. In some implementations, the identifier of the metadata URIs 180 may be, or may be used to generate, a bucket key identifying an object (e.g., the token metadata 185) stored in a bucket (e.g., the database 115, or a bucket thereof, identified by the base URI).

The storage 117 can store or otherwise maintain data for one or more contests 190, for example, in one or more data structures. The contests 190 can be any game, competition, wager, fantasy draft, or other such event that enables one or more players to compete against each other with a player-submitted lineup of athletes, teams, or game tokens, based on live events. Data for the contests 190 can be generated and maintained by the data processing system 105, by a player, or by an external system. The contests 190 can be based around live sporting events (e.g., fantasy sports contests). For example, a contest can include rules and contests based upon the duration, sub-events and outcome of a sporting event, of a specific time period of a sporting event, actions made by participants in a sporting event, or other sub-events of the sporting event. The contests 190 can be updated periodically, such as daily, weekly, or according to a schedule of live sporting events, in some implementations. Available contests can be provided to one or more client devices 120 in response to a request from a client device 120. A contest 190 can be designated as unavailable to a player due to at least a time limit expiring, the live event occurring, an existing entrance into the contest by the player, a conflicting contest already having been entered, or a threshold number of participants already entered into the contest. In some implementations, not all contests are available to all players. For example, entrance of a contest can be made available only for players who have a received an entrance ticket, allowance, code, etc.

In some embodiments, an indication that a contest 190 has been entered by a player can be stored in their player profile 170. For example, a player may enter a contest 190 by selecting the corresponding contest by the application executing on the client device 120 and submitting a lineup to the contest 190. The lineup can include one or more tokens that are identified as owned by the player in the player profile 170. For example, a player can select one or more NFTs which satisfy the respective restriction rules of the slots of the contest, as determined by various rules of the contest. The status of the contest 190 can be monitored and information about it can be stored and updated in the storage 117, as described herein. For example, a contest 190 may be marked as updated, completed, won, or lost, among other statuses, once the live sporting event corresponding to the contest 190 has been completed, and the information regarding what occurred during the live sporting event (e.g., the outcome, plays made, scores at predetermined times of the live sporting event, etc.), may be updated.

In some implementations, one or more of the contests 190 may be live sporting events in which athletes or other types of participants compete. In such implementations, wagers may be placed on outcomes of or events that occur during the contests 190 via corresponding player profiles 170. Additionally, the techniques described herein may be used to update the token metadata 185 in response to the detection of plays, occurrences, changes, or outcomes of the live sporting event contests 190. For example, when a score is updated in a game, token metadata 185 of a corresponding token (e.g., a token representing an athlete that scored a point, a token representing the live sporting event itself, etc.) may be updated to reflect the updated score. In another example, if an athlete scores points in a live sporting event contest 190, token metadata 185 for a token corresponding to that athlete may be updated to reflect the update to their lifetime points scored, or any other affected sport statistics of that athlete or a related team. The contests 190 may therefore refer to either live sporting events, or to fantasy sports contests in which the tokens described here may be entered.

Referring now to the operations of the data processing system 105, the token minter 135 can initiate the minting of one or more tokens, for example, by creating and broadcasting a transaction on the blockchain network 125 that calls a minting function of a smart contract to mint various tokens (e.g., NFTs such as ERC-721 tokens, etc.) described herein.

The token minter 135 may initiate minting of one or more tokens in response to input from an operator of the data processing system 105, in response to a request from an external computing system via the network 110, or in response to detecting that a predetermined rule or condition previously provided to the token minter 135 has been satisfied. The transaction request that initiates minting may include an address of the smart contract (or the minting function thereof), a number of the one or more tokens to be minted, and various properties of the token(s) that are to be written to the blockchain.

The smart contract may be previously provided on the blockchain network 125 by the data processing system 105 or another computing system. The minting function of the smart contract may receive various parameters, which may be encoded in the transaction used to mint the tokens. For example, the minting function of the smart contract may receive various parameters as part of the transaction, including a destination wallet for the resulting tokens (e.g., the central wallet associated with the data processing system 105), a number of tokens to mint, a type of token to mint, and/or a base URI that for all generated tokens.

Because a single base URI is shared among many generated tokens on the blockchain, less information needs to be written to the blockchain, reducing congestion in the blockchain network 125 and improving minting performance. Because the token identifier of each token is known, it may be utilized as an additional parameter for the base URI to identify a location in the database 115 of the token metadata 185 for the token. In some implementations, the smart contract may generate a unique token identifier for each token. In some implementations, the unique token identifier may be generated by the token minter 135, which may include the identifier of the token in the transaction request as a parameter for the smart contract.

Once the transaction request to mint the one or more tokens has been transmitted to the blockchain network 125, the blockchain network 125 may return a transaction hash, which can be a unique identifier for the transaction on the blockchain. Using this transaction hash, the token minter 135 can monitor the progress of the transaction to determine whether the tokens have been minted. For example, the token minter 135, or the data processing system 105, may be a node of the blockchain network 125. The token minter 135 can determine whether the transaction to mint the tokens is confirmed by scanning for newly created blocks on the blockchain. In some implementations, the smart contract may emit events over the blockchain network 125 during the minting process that can be detected, for example, by querying event logs of the smart contract. Events may include information about the successful minting of tokens, such as the number of tokens minted and the address to which they were assigned. The token minter 135 may verify the token balance of the wallet address associated with the data processing system 105 (e.g., the central wallet). By querying the blockchain or using appropriate wallet interfaces, the token minter 135 can determine that the tokens have been successfully minted and added to the central wallet. If the token balance reflects the expected minted tokens (e.g., the token minter 135 determines that the token(s) have been transferred to the wallet address of the central wallet), it indicates that the minting process has completed.

Once token minter 135 has determined that the token(s) have been minted on the blockchain, the metadata manager 145 can generate and/or store token metadata 185 for each minted token at a location in the database 115 corresponding to the identifier of the token. The identifier of the token may be predictable based on the logic of the smart contract (e.g., an incrementing counter, etc.), which can be determined by the metadata manager 145 based on previously minted tokens (e.g., as indicated on the blockchain, etc.) or a counter value locally stored in the data processing system 105 that mirrors the smart contract counter value for each successfully minted token. In some implementations, each token's unique identifier may be provided (and maintained locally and made accessible by) the token minter 135 prior to minting.

As described herein, the database 115 may be a data repository (e.g., a cloud storage bucket), and the token metadata 185 for a minted token may be stored as a suitable file, binary blob, or data structure in the database 115. The location at which the metadata is stored may be indicated by the identifier of the token. In some implementations, the metadata manager 145 can first encode or encrypt (using a suitable encoding or encryption algorithm) the token identifier and utilize the encoded or encrypted version of the token identifier as the identifier of the location for the corresponding token metadata 185 in the database 115.

The token metadata 185 may include any metadata that may correspond to a token. For example, if the minted token is an NFT for a player of a sports team, the metadata may identify the name of the player, the team of the player, a location of an image depicting the player, rarity information for the token, an edition number for the token, additional contest-specific attributes for the token, such as identifiers of contests 190 in which the token is eligible to enter, identifiers of pending or open contests 190 in which the token has been entered, the score of the corresponding token once historical contests 190 in which the token have been entered, among other information relating to the token. In some implementations, the token metadata may be updated by the metadata manager 145 or other components of the data processing system 105 upon detecting that the token has been entered into a contest 190 (e.g., in response to a corresponding request from a client device 120, etc.). The token metadata 185 for a token may identify a player profile 170 as an owner of the token, or if the token has not yet been purchased, identify that the token is not yet owned.

The metadata manager 145 can generate a corresponding metadata URI 180 for each minted token based on the base URI utilized by the token minter 135 when minting the tokens and the identifiers for the tokens. As described herein, the base URI may be written to the blockchain as a URI field. The base URI may be retrieved from a local storage (e.g., in a stored configuration file, a remotely stored configuration file, etc.) or by querying the blockchain network 125 to retrieve the base URI written to the blockchain that is shared by each minted token. In some implementations, no URI may be written to the blockchain, and the base URI may instead only be maintained locally by the data processing system 105.

To generate the metadata URI 180 for a token that has been minted, the metadata manager 145 may include the unique identifier of the token as a URI parameter of the base URI to generate corresponding metadata URI 180 of the token. In one example, the identifier of the token may be appended as a URI parameter (e.g., a query parameter, a path parameter, a matrix parameter, a fragment identifier, etc.) of the base URI. In some implementations, the metadata manager 145 may first encrypt or encode the identifier of a token, and then generate the metadata URI 180 for the token using the encrypted identifier and the base URI. For example, rather than including the identifier of the token itself as a parameter of the base URI, the metadata manager 145 may include the encoded or encrypted version of the token identifier as the URI parameter. In some implementations, additional parameters may be provided, such as key values to access data stored in the database 115 (e.g., authentication credentials, key values, etc.), among any other type of URI parameter for the base URI. As shown, metadata URIs 180 for each minted token may be stored in the storage 117 and may be utilized to generate or update corresponding token metadata 185 for each token, as described herein. A representation of how a metadata URI 180 for an example token is used to identify the location of corresponding token metadata 185 is shown in FIG. 2.

Figure 2:
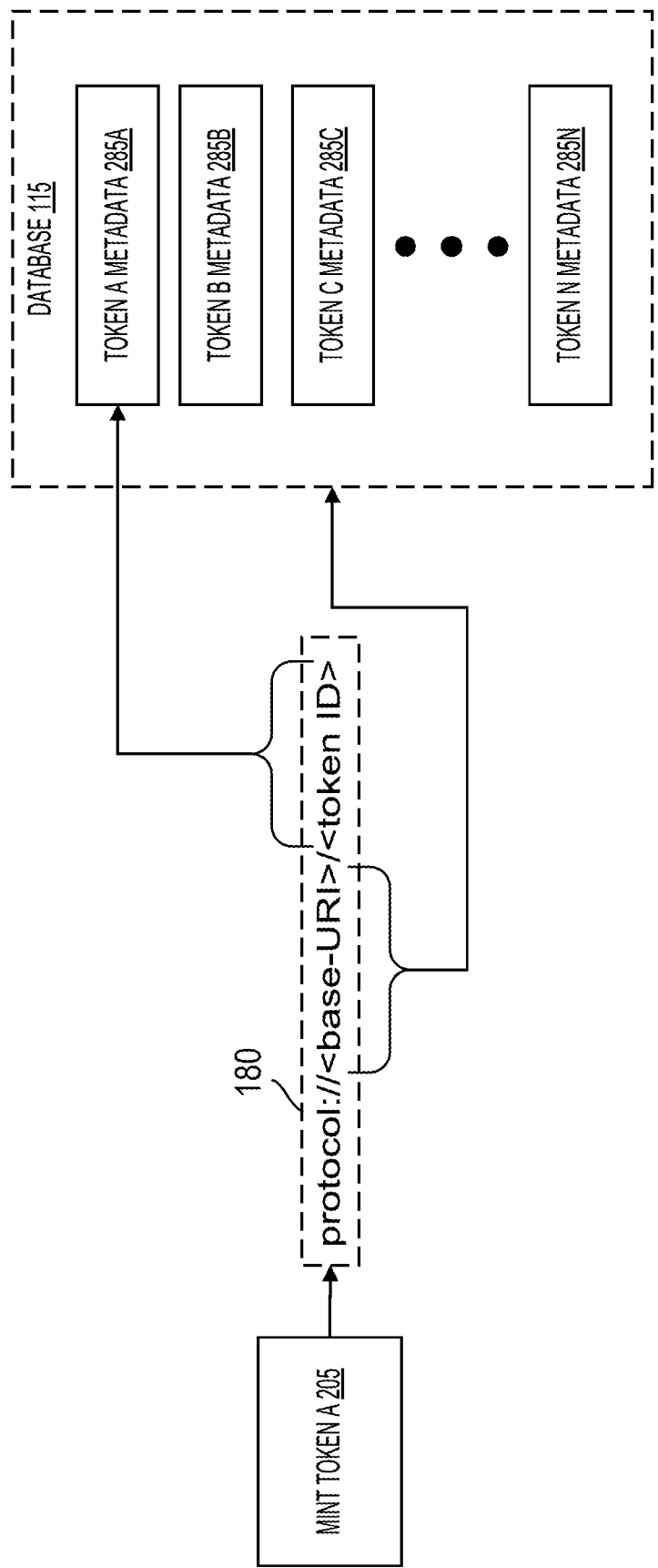
FIG. 2 illustrates an example dataflow diagram showing generation of a metadata URI using a base URI to identify a location of token metadata in a database, in accordance with one or more implementations.

Referring to FIG. 2 and within the context of the components described in connection with FIG. 1, an example dataflow diagram 200 is illustrated showing the generation of a metadata URI 180 using a base URI. As shown, the metadata URI 180 identifies a location of corresponding token metadata 185A in the database 115. The dataflow diagram 200 shows that at step 205, a token is minted using the techniques described in connection with the token minter 135 of FIG. 1. For example, an example token (e.g., an NFT), which is be referred to in the example context of the dataflow diagram 200 as "token A," can be minted on the blockchain (e.g., via the blockchain network 125).

Once token A has been minted on the blockchain, a corresponding metadata URI 180 for token A can be generated that identifies the location of the metadata for token A. As shown, in this example, the database 115 stores token metadata 185A-185N (which may include any of the structure or functionality of the token metadata 185) for corresponding tokens minted on the blockchain. The metadata URI 180 generated for newly-minted token A includes a protocol portion (designated by "protocol://"), which may be any suitable protocol for accessing the database 115. The metadata URI 180 further includes a base URI portion, which may be a URI that is written to the blockchain for token A and other tokens minted on the blockchain via processes initiated by the data processing system 105 or computing systems associated with the data processing system 105.

The base URI may be any type of URI, and may include any number or type of parameters, including path parameters, fragment parameters, or query parameters, among others. The base URI may identify a top-level memory location of the database 115 that may be queried using additional parameters to identify corresponding token metadata for a particular token. In this example, the "token A metadata 285A" is the corresponding token metadata for token A. To access the location in the database 115 designated for the token A metadata 285A, the identifier of token A may be included as a parameter of the base URI to generate the metadata URI 180 for token A. In this example, the token identifier for token A is included as a path parameter of the base URI. However, it should be understood that the token identifier for token A may be included as any type of parameter of the base URI, and that any number of parameters may be included in the metadata URI to achieve useful results. A metadata URI 180 for a token may be utilized to create, store, update, delete, modify, or otherwise access corresponding token metadata 185 of the token, as described herein. As shown, additional token metadata 285B-N may be stored in the database 115, each of which may be accessed using corresponding metadata URIs generated for each token.

Referring back to FIG. 1, the components of the data processing system 105 may create, store, update, delete, modify, or otherwise access corresponding token metadata 185 of a token (e.g., an NFT such as an ERC-721 token, as described herein) using the generated metadata URI 180 of the token. For example, the metadata manager 145 may transmit a request to create the token metadata 185 for a token using the generated metadata URI 180 to indicate the network location at which the token metadata 185 should be created (e.g., in the database 115). If the token metadata 185 has already been created, the metadata manager 145 can access, modify, or token metadata 185, for example, using corresponding API calls to the database 115.

The API calls may include the metadata URI 180 for the token, and may be initiated, in some implementations, by corresponding software associated with the database 115 that is executed on the data processing system 105. In some implementations, the token metadata 185 of a token may be modified using a corresponding web request, such a hyper-text transfer protocol (HTTP), a secure hyper-text transfer protocol (HTTPS), a file transfer protocol (FTP), or a secure file transfer protocol (FTPS), among others, using the metadata URI 180 for the token. The metadata manager 145 may access, modify, or delete token metadata 185 for a token in response to various conditions. For example, the metadata manager 145 may retrieve and provide token metadata 185 relating to a token in response to a corresponding request from a client device 120. The token metadata 185 of a token may be updated, in some implementations, upon detecting that the token has been identified as an entrant for a contest 190. Other changes in status relating to a contest 190 may also cause the token metadata 185 for a token to be updated.

More generally, the status detector 155 can monitor and detect a change to the status of a contest identified in token metadata 185 of one or more minted tokens. As described herein, tokens may be owned by players and entered into contests 190. For example, a client device 120 associated with a player profile 170 that is identified as owning a token may transmit a request to enter a fantasy sports lineup into a contest. The fantasy sports lineup may identify token(s) (identified as owned in the player profile 170) as entrants. Upon detecting that the player has identified the tokens as entrants (e.g., using the identifier of the token in a request, etc.), the metadata manager 145 may retrieve or generate the metadata URI(s) 180 for the identified tokens, and modify the token metadata 185 for said tokens to include identifier(s) of the contest(s) 190 in which the tokens have been entered. In some implementations, the token metadata 185 may be updated to include a "lock" indication, which prevents the data processing system 105 from entering the token(s) into other contests 190 until the contests in which the token(s) have already been entered have ended or reached a termination condition. Once the contests 190 in which the token(s) have been entered have completed or terminated, the token metadata 185 of the token(s) may be updated to remove the lock indication (and in some implementations, to add an "unlocked" indication), such that they may be utilized to enter other contests 190.

The status detector 155 may monitor changes in the status of the contests 190 that a player has entered, and can cause the token metadata 185 of any tokens entered into said contests 190 to be updated based on the change in status. To detect change in status, the status detector 155 may, in some implementations, receive an update message identifying the change in the status from one or more external computing devices. The change in status may be any type of status of the contest, including a determination of an outcome of the contest, an indication of at least one fantasy lineup corresponding to the outcome of the contest, or an indication of a score assigned to the token during the contest. In some implementations, the status detector 155 may itself maintain the status of each active (e.g., not expired, currently open or currently in-play) contest 190, including managing entrants to a contest 190 prior contest initiation, management of the status of the contest 190 while related live sporting event(s) are being played, and providing payouts, awards, or notifications based on changes to the status of the contest 190 (including termination of the contest 190).

The status detector 155 may receive messages from one or more computing devices that provide update information relating to occurrences or status information of live sporting events to which the contest(s) 190 relate. The updated information may be provided in the form of event messages or polls to data feeds from computing devices that provide real-time updates relating to live sporting events. If an occurrence in a live sporting event (e.g., a play being made by an athlete, a change in score, a foul, a change in game state, etc.) relates to the rules of a contest 190, the status detector 155 may update status of the contest 190 accordingly. For example, the status detector 155 can adjust the scores and statistics of individual players and teams (both of which may correspond to respective token(s)) identified as entrants to the contest 190, based on the received messages. The scoring rules defined for the contest 190 can be applied to calculate the updated scores for each entrant, reflecting their performance in the live sporting event.

In implementations where a contest 190 is a live sporting event, the status detector 155 can detect occurrences (e.g., plays, changes in score, outcomes, etc.) during the live sporting event from the messages. The status detector 155 may identify changes to statistics of an athlete (e.g., lifetime points scored, total points scored during the game, total points scored during a series of games, etc.) participating in the contest 190. The status detector 155 can flag the changes in statistics for use in updating token metadata 185 of token(s) corresponding to the athlete, such that the token metadata 185 can store up-to-date information on sporting statistics for the athlete or the team for which the athlete plays.

Upon detecting the change to the status of the contest, the metadata manager 145 can modify the token metadata 185 of the token using the metadata URI 180 for that token. In some implementations, the metadata manager 145 can modify the token metadata 185 of a token by storing an identifier of the contest 190 in which the token has been entered as part of the token metadata 185. In some implementations, any change in the status of the contest(s) 190 in which a token has been entered may or may not be included in the token metadata 185 for the token, including any score information for the contest 190, plays that occur in the live sporting event relating to the contest 190, or outcomes of the contest 190 (e.g., whether a fantasy sports lineup won the contest 190, etc.). The token metadata 185 for a token may also be updated with meta-information about contests 190 managed by the data processing system 105, such as a number of contests 190 that have been won using the corresponding token as an entrant, a number of contests 190 that have been lost using the corresponding token as an entrant, total fantasy points earned across multiple contests using the token, a number of contests 190 that have been won using the corresponding token in a fantasy sports lineup, a number of lineups in which the token has been included, or any other information relating to fantasy sports data.

The token metadata 185 may also be updated to indicate whether different player profiles 170 are identified as owners of the corresponding token. In some implementations, client devices 120 corresponding to player profiles 170 may transmit requests to transfer ownership of a token to another player profile 170 (e.g., via a transaction on a marketplace). The metadata manager 145 may monitor such requests and update the token metadata 185 of the token accordingly to reflecting the owning player profile 170. For example, the metadata manager 145 can determine that a token has been assigned to a player profile 170 maintained by the data processing system 105, retrieve or generate the metadata URI 180 for that token, and update the token metadata 185 of the token to include an identifier of the player profile 170 using the metadata URI 180, as described herein. In some implementations, the metadata manager 145 may delete token metadata 185 of a token upon detecting that a time period associated with the token has expired. The time period may be identified in the token metadata 185 of the token and may be defined when the token itself is minted.

In some implementations, tokens may be minted to represent athletes, other participants of live sporting events, or teams that may compete in live sporting events. In such implementations, the token metadata 185 of tokens corresponding to a participant or team may be updated according to their sporting statistics, actions taken during a live sporting event, or the outcomes of live sporting events in which the participant or team played. Any type of sporting statistic may be identified and stored as part of the token metadata 185 for token(s) corresponding to athletes or teams that participate in live sporting events.

Figure 3:
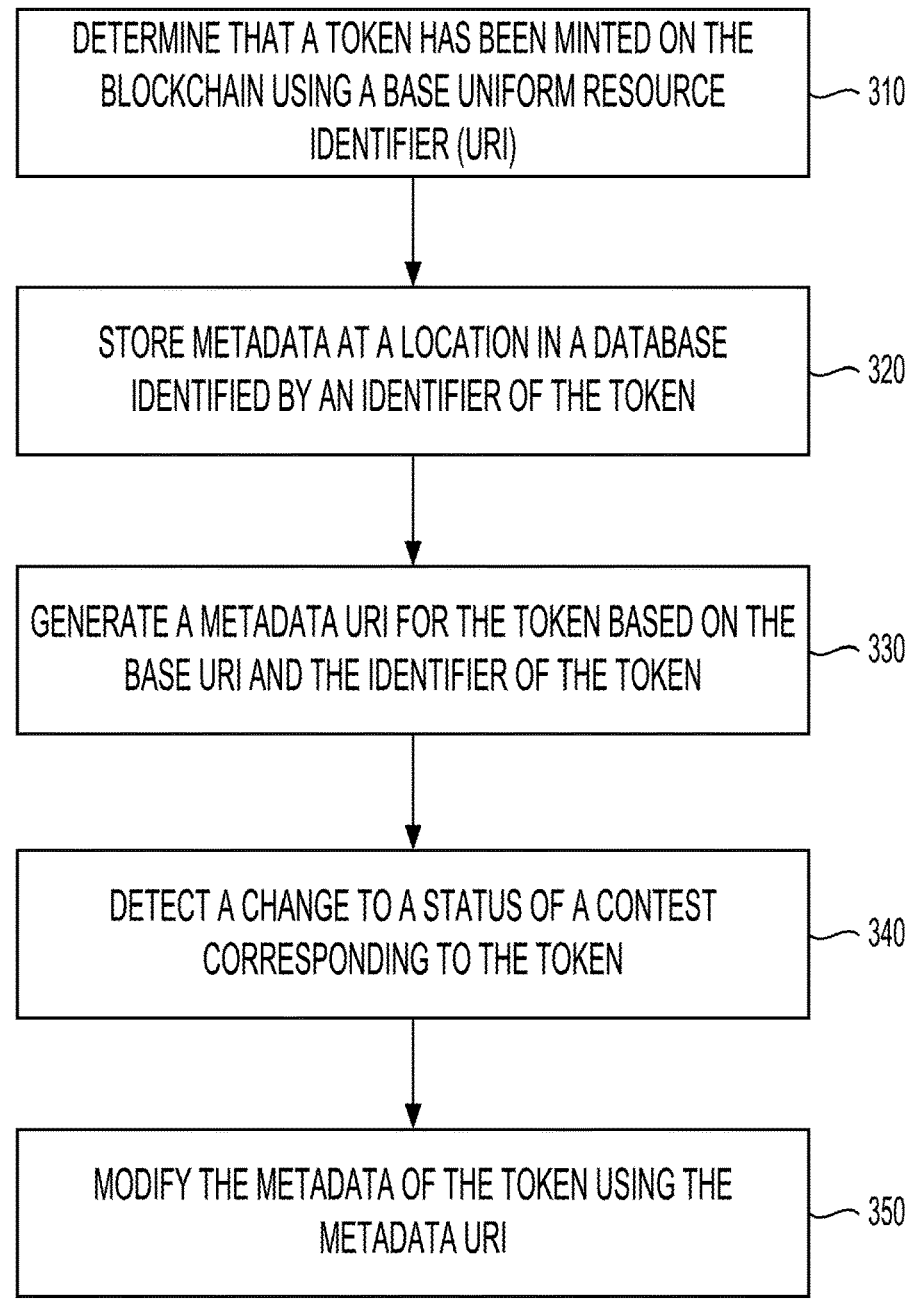
FIG. 3 illustrates a flow diagram of an example method of improving the performance of minting and managing metadata for tokens, in accordance with one or more implementations.

FIG. 3 illustrates a flow diagram of an example method 300 of improving the performance of minting and managing metadata (e.g., the token metadata 185) for tokens, in accordance with one or more implementations. The method 300 may be performed, for example, by the data processing system 105, the client device 120, or any other computing system described herein.

Although the method 300 is described as being performed by the data processing system 105, it should nevertheless be understood that any computing device may perform the various operations of the method 300 and communicate any results of the operations or intermediate computations relating to the operations to any other computing device described. The method 300 is described as having steps 310-350. However, it should be understood that the steps (referred to as ACTs) may be performed in any order, and that steps may be omitted or added to achieve useful results.

At ACT 310, the data processing system (e.g., the data processing system 105) can determine that a token has been minted on a blockchain based on a smart contract identifying an identifier of the token and a base URI. To do so, the data processing system may perform any one or more of the functionalities described in connection with the token minter 135 of FIG. 1. For example, the data processing system 105 can initiate minting of one or more tokens (e.g., NFTs such as ERC-721 tokens, etc.) on a blockchain network (e.g., the blockchain network 125) by transmitting one or more transaction requests that identify an address of the smart contract. The transaction request can call a minting function of the smart contract that causes the any requests number of token(s) to be minted on the blockchain. The data processing system can determine whether the token(s) have been minted by determining whether the token(s) have been transferred to the wallet address (e.g., as identified in a new block of the blockchain). The base URI can be shared by each minted token and can point to a location of a database (e.g., the database 115) that stores metadata for the tokens (e.g., the token metadata 185), as described herein.

At ACT 320, responsive to determining that the token has been minted on the blockchain, the data processing system can store metadata for the token (e.g., the token metadata 185) at a location in a database (e.g., the database 115). The location can be identified by the identifier of the token. The database can correspond to the base URI shared by the tokens minted in ACT 310. To do so, the data processing system can perform any of the functionality of the metadata manager 145 described in connection with FIG. 1. The metadata of the token can include any of the metadata described herein, including at least one rarity value for the token and at least one edition number for the token. Corresponding metadata can be generated for each token minted in ACT 310.

At ACT 330, the data processing system can generate a metadata URI (e.g., the metadata URI 180) for the token based on the base URI and the identifier for the token. To do so, the data processing system can perform any of the operations of the metadata manager 145 described in connection with FIG. 1. An example metadata URI, and how it corresponds to a respective location of stored metadata in the database, is also described in connection with FIG. 2. To generate the metadata URI of a token, the data processing system can include the identifier for the token as a URI parameter of the base URI corresponding to the database. In some implementations, the data processing system can append the identifier of the token to the base URI as the URI parameter. In some implementations, the data processing system may encrypt or encode the token identifier prior to including it as a URI parameter of the base URI to generate the metadata URI. The database can decode or decrypt the encoded token identifier using a corresponding decoding process and may implement key sharing or other cryptographic techniques to maintain the security of the token metadata between the database 115 and the data processing system.

At ACT 340, the data processing system can detect a change in the status of a contest (e.g., a contest 190) identified in the metadata of the token. As described herein, the metadata for minted tokens may be updated to include indications that the corresponding token has been entered into a contest maintained by the data processing system. When updates to the contest occur, the data processing system can update the metadata of any token(s) entered into the contest using the corresponding metadata URIs of each of the token(s). To do so, the data processing system can perform any of the functionalities of the status detector 155 and/or the metadata manager 145 described in connection with FIG. 1. In some implementations, to detect changes in the status of a contest, the data processing system can receive an update message identifying the change in the status from one or more servers or computing devices. The change in the status may include one or more of a determination of an outcome of the contest, an indication of at least one fantasy lineup corresponding to the outcome of the contest, or an indication of a score (e.g., fantasy sports points) assigned to a respective token during the contest.

At ACT 350, responsive to detecting the change to the status of the contest, the data processing system can modify the metadata of the token using the metadata URI. To do so, the data processing system may perform any of the functionalities of the metadata manager 145 described in connection with FIG. 1. For example, to modify the metadata of a token, the data processing system can execute an API call corresponding to the database using the metadata URI generated for the token. As described herein, the metadata URI can identify a location in the database at which the metadata for the token is stored. Updating the metadata can include providing corresponding update commands via the API call, including transmitting any information to be added or replaced in the database.

The metadata for a token can be updated to include an identifier of any contest in which the token has been entered (e.g., in response to a request for a client device). Any portion of the status of the contest may also be included in the metadata of the token, including, but not limited to, any fantasy sports points earned during the contest, a number of fantasy sports contests won, a number of fantasy sports contests lost, a number of contests entered, or information relating to the lineups in which the token was entered, among others. The data processing system may also update the metadata of a token to reflect up-to-date ownership information of the token. As described herein, a player profile (e.g., a player profile 170) may be identified as an owner of the token, and this ownership may be stored as part of the metadata for the token (as well as stored as part of the player profile, in some implementations). The data processing system can monitor any requests from computing devices that provide a marketplace or trading platform to determine whether the token has been assigned to a player profile as an owner (including changes of ownership to another player profile). Upon detecting such assignment, the data processing system can update the metadata of the token to include an identifier of the player profile as an owner.

Figure 4:
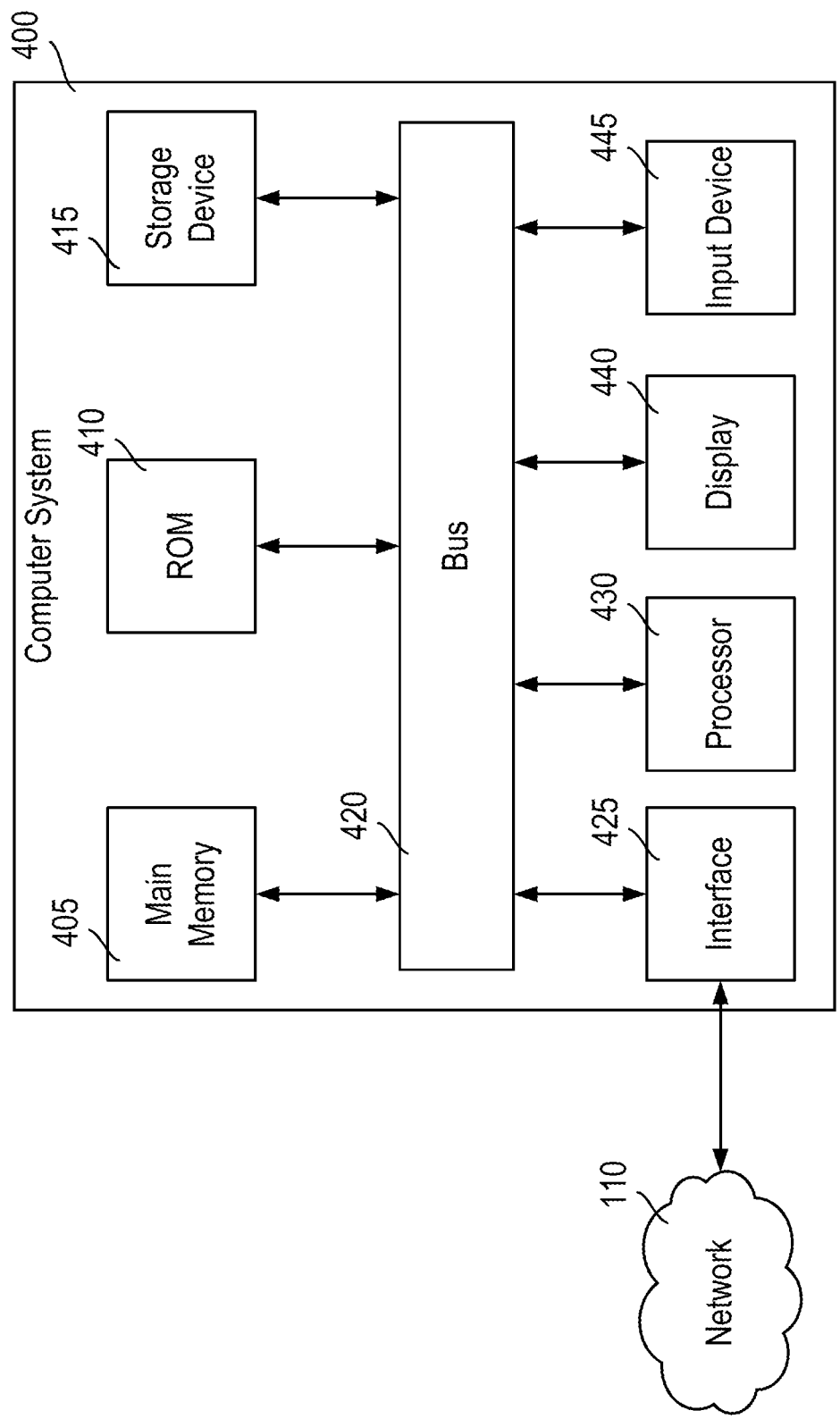
FIG. 4 is a block diagram of an example data processing system and computing environment that may be utilized to perform various techniques or operations described herein, in accordance with one or more implementations.

Referring to FIG. 4, an implementation of a computing system 400 is shown that can be used, for example, to implement the systems and methods described with reference to FIGS. 1, 2, and 3. The computing architecture described in FIG. 4 can be used to implement the data processing system 105, one or more of the client devices 120, or any other computing system described herein. The computing system 400 includes a bus 420 or other communication component for communicating information and a processor 430 coupled to the bus 420 for processing information. The computing system 400 also includes main memory 405, such as a random-access memory (RAM) or other dynamic storage device, coupled to the bus 420 for storing information, and instructions to be executed by the processor 430. The main memory 405 can also be used for storing position information, temporary variables, or other intermediate information during execution of instructions by the processor 430. The computing system 400 may further include a read-only memory (ROM) 410 or other static storage device coupled to the bus 420 for storing static information and instructions for the processor 430. A storage device 415, such as a solid-state device, magnetic disk, or optical disk, is coupled to the bus 420 for persistently storing information and instructions.

The computing system 400 may be coupled via the bus 420 to a display 440, such as a liquid crystal display, or active-matrix display, for displaying information to a user. The display 440 can be any type of display device, including a touchscreen device. An input device 445, such as a keyboard having alphanumeric and other keys, may be coupled to the bus 420 for communicating information, and command selections to the processor 430. The input device 445 can include a touch sensor of the touchscreen display 440. The input device 445 can include a cursor control, such as a mouse, a trackball, or cursor direction keys, for communicating direction information and command selections to the processor 430 and for controlling cursor movement on the display 440.

The computing system 400 can include an interface 425, such as a networking adapter. The interface 425 may be coupled to bus 420 and may be configured to enable communications with a computing or communications network 110 and/or other computing systems. Any type of networking configuration may be achieved using interface 425, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 400 in response to the processor 430 executing an arrangement of instructions contained in main memory 405. Such instructions can be read into main memory 405 from another computer-readable medium, such as the storage device 415. Execution of the arrangement of instructions contained in main memory 405 causes the computing system 400 to perform the illustrative processes described herein. One or more processors in a multi-processing arrangement may also be employed to execute the instructions contained in main memory 405. In alternative implementations, hard-wired circuitry may be used in place of or in combination with software instructions to implement illustrative implementations. Thus, implementations are not limited to any specific combination of hardware circuitry and software.

Although an example processing system has been described in FIG. 4, implementations of the subject matter and the functional operations described in this specification can be carried out using other types of digital electronic circuitry, or in computer software, firmware, or hardware, including the structures disclosed in this specification and their structural equivalents, or in combinations of one or more of them.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, one or more servers, part of a search engine, or, a logic device having one or more processing modules.

Having now described some illustrative implementations and implementations, it is apparent that the foregoing is illustrative and not limiting, having been presented by way of example. In particular, although many of the examples presented herein involve specific combinations of method acts or system elements, those acts and elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Instances of "or" may be construed as inclusive so that any terms described using "or" may indicate any of a single, more than one, or all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
   determining, by one or more processors and non-transitory memory, that a token has been minted on a blockchain based on a smart contract identifying an identifier of the token and a base uniform resource identifier (URI);
   responsive to determining that the token has been minted on the blockchain, storing, by the one or more processors, metadata for the token at a location in a database, the location identified by the identifier of the token, the database corresponding to the base URI;
   generating, by the one or more processors, a metadata URI for the token based on the base URI and the identifier for the token;
   detecting, by the one or more processors, a change to a status of a contest identified in the metadata of the token; and
   responsive to detecting the change to the status of the contest, modifying, by the one or more processors, the metadata of the token using the metadata URI.

2. The method of claim 1, wherein generating the metadata URI comprises appending, by the one or more processors, the identifier of the token to the base URI as a URI parameter.

3. The method of claim 1, wherein detecting the change to the status of the contest comprises receiving, by the one or more processors, an update message identifying the change to the status from one or more servers.

4. The method of claim 1, further comprising causing, by the one or more processors, a second token to be minted on the blockchain, the second token associated with the base URI and a second identifier.

5. The method of claim 4, further comprising accessing, by the one or more processors, second metadata of the second token using a second metadata URI generated based on the base URI and the second identifier.

6. The method of claim 1, wherein the change in the status comprises one or more of a determination of an outcome of the contest, an indication of at least one fantasy lineup corresponding to the outcome of the contest, or an indication of a score assigned to the token during the contest.

7. The method of claim 1, wherein modifying the metadata of the token comprises storing, by the one or more processors, an identifier of the contest as part of the metadata.

8. The method of claim 1, further comprising:
   determining, by the one or more processors, that the token has been assigned to a player profile of a plurality of player profiles; and
   updating, by the one or more processors, the metadata of the token to include an identifier of the player profile.

9. The method of claim 1, wherein the smart contract further identifies a wallet address, and wherein determining that the token has been minted on the blockchain further comprises determining, by the one or more processors, that the token has been transferred to the wallet address.

10. The method of claim 9, further comprising generating, by the one or more processors, the metadata of the token to include at least one rarity value and at least one edition number.

11. A system, comprising:
    non-transitory memory; and
    one or more processors coupled to the non-transitory memory, the one or more processors configured to:
      determine that a token has been minted on a blockchain based on a smart contract identifying an identifier of the token and a base uniform resource identifier (URI);
      responsive to determining that the token has been minted on the blockchain, store metadata for the token at a location in a database, the location identified by the identifier of the token, the database corresponding to the base URI;
      generate a metadata URI for the token based on the base URI and the identifier for the token;
      detect a change to a status of a contest identified in the metadata of the token; and
      responsive to detecting the change to the status of the contest, modify the metadata of the token using the metadata URI.

12. The system of claim 11, wherein the one or more processors are further configured to generate the metadata URI by performing operations comprising appending the identifier of the token to the base URI as a URI parameter.

13. The system of claim 11, wherein the one or more processors are further configured to detect the change to the status of the contest by performing operations comprising receiving an update message identifying the change to the status from one or more servers.

14. The system of claim 11, wherein the one or more processors are further configured to cause a second token to be minted on the blockchain, the second token associated with the base URI and a second identifier.

15. The system of claim 14, wherein the one or more processors are further configured to access second metadata of the second token using a second metadata URI generated based on the base URI and the second identifier.

16. The system of claim 11, wherein the change in the status comprises one or more of a determination of an outcome of the contest, an indication of at least one fantasy lineup corresponding to the outcome of the contest, or an indication of a score assigned to the token during the contest.

17. The system of claim 11, wherein the one or more processors are further configured to modify the metadata of the token comprises storing, by the one or more processors, an identifier of the contest as part of the metadata.

18. The system of claim 11, wherein the one or more processors are further configured to:
   determine that the token has been assigned to a player profile of a plurality of player profiles; and
   update the metadata of the token to include an identifier of the player profile.

19. The system of claim 11, wherein the smart contract further identifies a wallet address, and wherein the one or more processors are further configured to determine that the token has been minted on the blockchain by performing operations comprising determining that the token has been transferred to the wallet address.

20. The system of claim 19, wherein the one or more processors are further configured to generate the metadata of the token to include at least one rarity value and at least one edition number.

* * * * *